March 4, 1930.   F. L. WELT   1,749,652
CLAMPING DEVICE
Original Filed Feb. 10, 1928
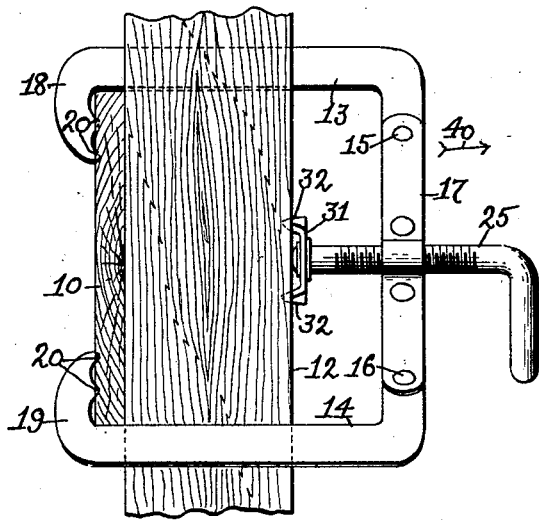
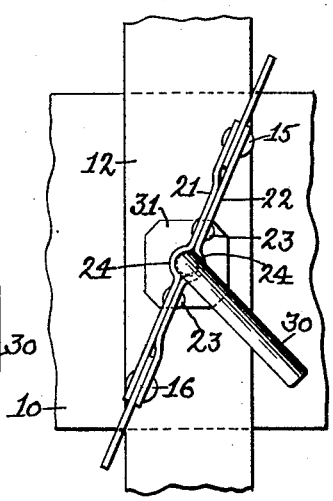
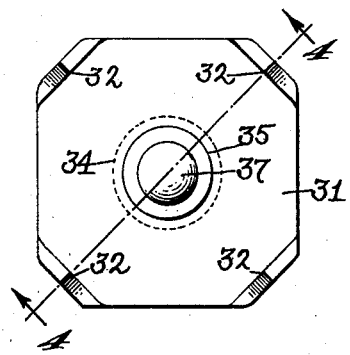
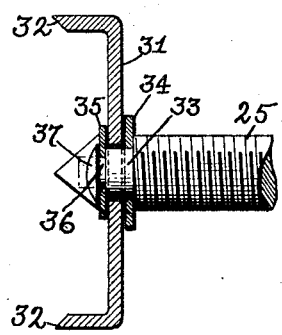
Inventor
Frank L. Welt
by Jas. H. Churchill
atty.

Patented Mar. 4, 1930

1,749,652

UNITED STATES PATENT OFFICE

FRANK L. WELT, OF SOMERVILLE, MASSACHUSETTS; HOWARD L. WELT ADMINISTRATOR OF SAID FRANK L. WELT, DECEASED

CLAMPING DEVICE

Application filed February 10, 1928, Serial No. 253,459. Renewed January 22, 1930.

This invention relates to a clamping device for securing a plurality of objects together, and more particularly to a clamping device for securing a ledger board to an upright timber forming part of a staging used for supporting workmen.

The invention has for its object to provide a simple and efficient clamping device in which the clamping members are constructed and arranged so as to be transported as a unit, and also so that one member may straddle the upright timber and engage the ledger board, and so that the second member can be engaged with the upright timber on the side thereof opposite to that on which the ledger board is located.

The clamping members are of novel construction as will be described, whereby a strong and efficient clamping device is provided, which can be applied in a minimum time to the objects to be clamped together.

These and other features of this invention will be pointed out in the claims at the end of this specification.

Fig. 1 is a side elevation of a clamping device embodying this invention, showing the same in operative relation to a ledger board and upright timber;

Fig. 2, an elevation of the parts shown in Fig. 1, looking toward the left;

Fig. 3, an elevation of the movable clamping member shown in Fig. 1, and

Fig. 4, a section on the line 4—4, Fig. 3.

Referring to the drawing, 10 represents a ledger board and 12 an upright timber to which the ledger board is to be secured by a clamping device embodying this invention.

The clamping device herein shown consists of two members, one of which consists of two metal arms 13, 14 having their rear ends pivotally connected at 15, 16 to a cross head or member 17 and having at their front ends inwardly extended fingers 18, 19 preferably provided with teeth or projections 20 for penetrating into the ledger board 10.

The cross head 17 is herein shown as composed of two metal bars 21, 22 firmly secured together by rivets 23 or otherwise and each provided with a substantially semicircular outwardly extended curved portion 24.

The curved portions 24 of the bars 21, 22 are threaded on their inner surfaces and cooperate to provide the cross head with a threaded opening and form an internally threaded hub or nut through which is extended a screw-shaft 25 in threaded engagement with said hub or nut.

The shaft 25 is provided at its outer end with a crank or handle 30 and has mounted upon its inner end a device or member for engaging the upright timber 12, which member may and preferably will be made as a metal disk or plate 31 provided with a plurality of teeth or projections 32 for penetrating into the upright 12.

The toothed plate 31 is loosely mounted on a smooth, reduced portion 33 of the screw-shaft (see Fig. 4) and bears against a washer 34 mounted on the reduced portion 33.

The toothed plate 31 is retained on the reduced portion 33 of the screw-shaft by a washer 35 mounted on a second reduced portion 36 extended from the reduced portion 33, and by a head 37 on the smaller reduced portion, which head overlaps the washer 35 a substantial amount and is of substantial thickness to prevent the head being stripped off of the shaft, when the teeth 20, 32 on the clamping members are forced into the ledger board and upright timber by rotation of the shaft 25 in the proper direction to effect the clamping action desired.

In operation, the clamping device is applied to the upright timber with the arms 13, 14 located on opposite sides thereof and engaged with the top and bottom edges of the ledger board, and with the cross head 17 diagonally arranged with relation to the upright timber. The clamping device is then moved bodily until the teeth 32 on the plate 31 are engaged with the upright timber 12. At such time the toothed fingers 18, 19 on the arms 13, 14 are disengaged from the ledger board, and the upper arm 13 rests on the upper edge of the ledger board, and the lower arm 14 is held by the operator in engagement with the lower edge of the ledger board. The shaft 25 is then rotated in the proper direction to cause the cross head 17 to move on the shaft 25 away from the upright timber in the direction indicated by the arrow 40, Fig. 1.

The cross head 17 carries with it the arms 13, 14 until the teeth 20 on the fingers 18, 19 are engaged with the ledger board.

The operator continues to rotate the shaft 25 until the teeth 20 on the fingers 18, 19 are embedded in the ledger board and the teeth 32 on the plate 31 are embedded in the upright timber and until he is unable to rotate the screw-shaft 25.

When this occurs, the ledger board 10 is firmly clamped or secured to the upright timber 12. To release the ledger board it is only necessary to turn the screw-shaft 25 in the opposite direction until the toothed members of the device are disengaged from the ledger board and upright timber.

From the above description, it will be seen that the parts or members of the clamping device are connected together to be handled as a unit or one piece, capable of being shipped to the job ready for use and without danger of any of the parts being lost.

It will also be observed that the clamping device can be quickly and easily applied on the job.

The improved clamping device is especially useful for securing ledger boards to the upright timbers of a staging employed by masons for building brick and stone walls, particularly of buildings.

By pivoting the arms 13, 14 which engage the ledger board, to the cross head 17, the said arms are capable of being quickly and easily positioned with relation to the ledger board.

One embodiment of the invention is herein shown, but it is not desired to limit the invention to the particular construction shown.

What is claimed is:

1. In a clamping device, in combination, a cross head provided with an internally threaded hub, arms pivoted to said cross head and provided with fingers having teeth for engagement with a ledger board, a screw-shaft extended through said threaded hub in engagement with the latter, and provided at its inner end with reduced portions of different diameters, washers mounted on said reduced portions, a toothed plate loosely mounted on the reduced portion of larger diameter between said washers, and a head on the end of the reduced portion of smaller diameter overlapping the washer on said smaller reduced portion.

2. In a clamping device, in combination, a cross head provided with a threaded opening, arms pivoted to said cross head and provided with fingers for engaging one of the objects to be clamped together, a screw-shaft supported by said cross head in engagement with the threads in said opening, and a member loosely mounted on said screw-shaft for engagement with the second object to be clamped.

3. In a clamping device, in combination, a cross head provided with a threaded opening, arms pivoted to said cross head and provided with fingers having teeth for engaging one of the objects to be clamped together, a screw-shaft supported by said cross head in engagement with the threads in said opening, and a member loosely mounted on said screw-shaft and provided with teeth for engagement with the second object to be clamped.

4. In a clamping device, in combination, a cross head, arms secured at one end to said cross head to move therewith and extended therefrom substantially at right angles thereto and separated at their free ends to enable the said arms to straddle one of the objects to be clamped and permit the cross head to be moved toward and from said object, fingers on the free ends of said arms for engagement with said object, a screw-shaft supported by said cross head and co-operating therewith to effect movement of said cross head on said shaft by rotation of the latter, and a device on said shaft to engage the second object to be clamped.

5. In a clamping device, in combination, a cross head provided with a threaded opening, arms movably secured to said cross head and provided with extremities for engaging one of the objects to be clamped together, a screw-shaft supported by said cross head in engagement with the threads in said opening, and a member loosely mounted on said screw-shaft for engagement with the second object to be clamped.

6. In a clamping device, in combination, a cross head provided with a threaded opening, arms movably secured to said cross head and provided with extremities for engaging one of the objects to be clamped together, a screw-shaft supported by said cross head in engagement with the threads in said opening, and a member loosely mounted on said screw-shaft and provided with teeth for engagement with the second to be clamped.

7. A clamping device comprising a cross head composed of strips lying one upon the other and secured together with opposed semi-circular portions at midlength internally threaded and spaced at the extremities, arms having, respectively, one end secured between the spaced extremities and having at the other end ledger board engaging means and a screw shaft engaging said thread and carrying means for engagement with the second object to be clamped.

In testimony whereof, I have signed my name to this specification.

FRANK L. WELT.